MILLER & PICKERING.
Harrow.

No. 97,104. Patented Nov. 23, 1869.

Witnesses: Inventor:

United States Patent Office.

JOHN H. MILLER AND F. A. PICKERING, OF NIANTIC, ILLINOIS.

Letters Patent No. 97,104, dated November 23, 1869.

IMPROVEMENT IN HARROWS.

The Schedule referred to in these Letters Patent and making part of the same.

*To all whom it may concern:*

Be it known that we, JOHN H. MILLER and F. A. PICKERING, of Niantic, county of Macon, and State of Illinois, have invented a new and useful Improvement in Harrows; and we do hereby declare the following to be a full, clear, and exact description thereof, whereby others skilled in the art may make and use the same, reference being had to the accompanying drawings, forming part of this specification.

This invention relates to a new and useful improvement in harrows, whereby the parts which carry the harrow-teeth are made adjustable, so that obstructions may be avoided, and so that the harrow will adjust itself to the surface of the ground over which it passes; and It consists in the construction and arrangement hereinafter described.

In the accompanying drawings—

Similar letters of reference indicate corresponding parts.

A is the central bar, which extends the whole length of the harrow, to the front end of which the power is applied.

This bar is framed in two parts, which are hinged together, as seen at B, so that the rear end of the harrow may be raised by the driver for passing obstructions, and for adjusting itself to the surface of the ground.

There may be harrow-teeth in this central bar, if desired.

C C C C represent four rails, which carry the harrow-teeth.

These rails are jointed together, as seen at D D, and are jointed to both parts of the central bar A at E E.

Figure 2:
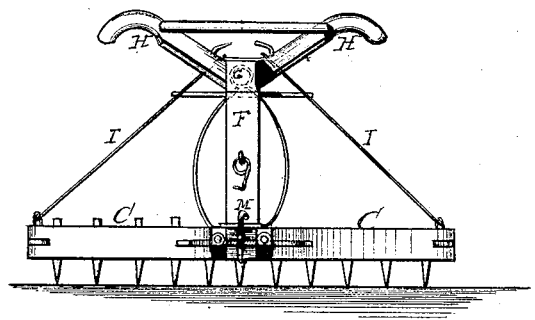
Figure 2 is a rear-end elevation.

To the forward or main portion of the bar A two standards are attached, which extend up, as seen in fig. 2, marked F, and supported by them is a roller or windlass, G.

H H represent the handles, which are attached to this windlass, so that the windlass may be turned thereby.

Figure 1:
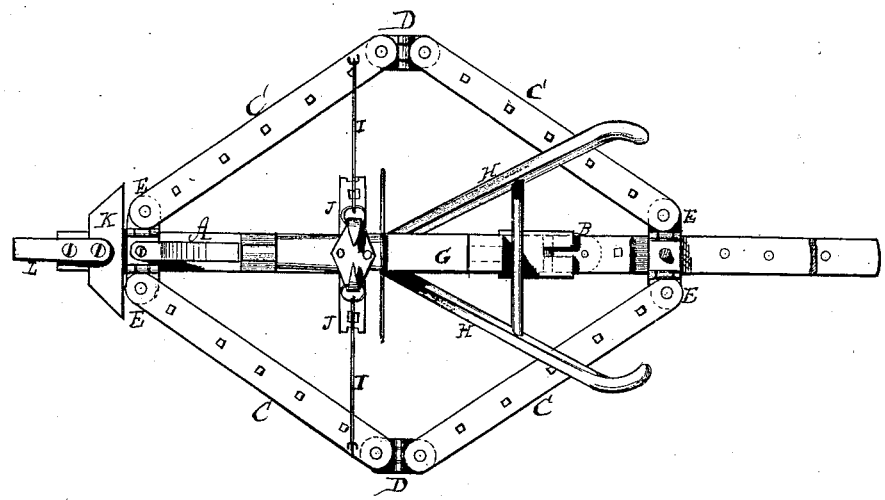
Figure 1 is a top or plan view of the harrow.

I I represent chains or ropes, which are attached to the rails, near the joints D D, on each side of the harrow, and are connected with the windlass by means of transverse hooks and guides, as seen at J J, fig. 1.

The windlass turns on pivots in the stands, as seen in fig. 1; and the arrangement is such that when the driver, by means of the handles, turns the windlass, either side of the harrow may be raised for passing over stones, roots, or other obstructions.

The sides of the harrow, or either of them, may be raised up and secured in an inclined position, by fastening them to the windlass, so that the harrow may be passed between rows of corn, or other crops growing in rows in the field.

In harrowing the ground, the flexibility of the harrow, caused by the hinged joints E, D, and B, will allow it to adjust itself to the inequalities of the ground.

K represents a transverse head-piece on the bar A, for the protection of the joints E E.

L is a hook, for the double-tree, for attaching the team.

M is a handle, attached to the bar A, for raising the rear end of the harrow.

We do not confine ourselves to the particular details as regards the construction of our harrow, but to the form and general construction, whereby it is so arranged that it may be so contracted in width to adapt it to corn cultivation, and so that it will adapt itself to the shape of the ground over which it passes, and also so that its sides or rear may be raised at will for avoiding obstructions, as before stated.

Having thus described our invention,

We claim as new and useful, and desire to secure by Letters Patent—

1. The combination of the toothed bars C C, central bar A, jointed connections D E B, and windlass G, substantially as described.

2. The windlass G, and the mode of raising the sides of the harrow, substantially as described.

JOHN H. MILLER.
F. A. PICKERING.

Witnesses:
M. P. MURPHEY,
J. B. MILLISON.